(12) United States Patent
Lau

(10) Patent No.: US 10,400,943 B2
(45) Date of Patent: Sep. 3, 2019

(54) HEIGHT ADJUSTABLE STAND

(71) Applicant: Cutter Technologies Pte Ltd, Singapore (SG)

(72) Inventor: Choon Meng Lau, Singapore (SG)

(73) Assignee: Cutter Technologies Pte Ltd, Singapore (SG)

( * ) Notice: Subject to any disclaimer, the term of this patent is extended or adjusted under 35 U.S.C. 154(b) by 69 days.

(21) Appl. No.: 15/563,554

(22) PCT Filed: Jul. 21, 2017

(86) PCT No.: PCT/SG2017/050370
§ 371 (c)(1),
(2) Date: Sep. 29, 2017

(87) PCT Pub. No.: WO2019/017838
PCT Pub. Date: Jan. 24, 2019

(65) Prior Publication Data
US 2019/0024843 A1    Jan. 24, 2019

(51) Int. Cl.
*F16M 11/38* (2006.01)
*F21S 6/00* (2006.01)
*F21V 21/28* (2006.01)
*F21V 23/06* (2006.01)
*F21Y 115/10* (2016.01)

(52) U.S. Cl.
CPC ............ *F16M 11/38* (2013.01); *F21S 6/00* (2013.01); *F21V 21/28* (2013.01); *F21V 23/06* (2013.01); *F21Y 2115/10* (2016.08)

(58) Field of Classification Search
CPC ......... F16M 11/38; F21V 21/24; F21V 21/26; F21V 21/28
USPC ....... 248/188.2, 188.6, 157, 166, 585; 108/9
See application file for complete search history.

(56) References Cited

U.S. PATENT DOCUMENTS

| | | | | |
|---|---|---|---|---|
| 70,339 | A * | 10/1867 | Kreitz .................... | A47B 19/06 108/9 |
| 1,947,647 | A * | 2/1934 | Holden ..................... | B66F 3/22 182/141 |
| 2,388,192 | A * | 10/1945 | Stechbart ............... | F16M 11/38 108/145 |
| 2,440,096 | A * | 4/1948 | Jury ....................... | F16M 11/38 248/421 |
| 3,435,570 | A * | 4/1969 | Berry .................... | E04H 12/185 108/145 |

(Continued)

*Primary Examiner* — Eret C McNichols

(57) ABSTRACT

A height adjustable stand comprising: a concave quadrilateral linkage comprising first, second, third and fourth links in successive pivoting-only connection, an internal angle greater than 180° between the second and third links, the first link defining a minimum length of a base of the stand; a first convex quadrilateral linkage comprising fifth, sixth, seventh and eighth links in successive pivoting-only connection, the fifth link being an extension of the second link where the second link connects to the third link, the sixth link being the same as the third link; and a second convex quadrilateral linkage comprising ninth, tenth, eleventh and twelfth links in successive pivoting-only connection, the ninth link comprising the seventh link and an extension of the seventh link where the seventh link connects to the eighth link, the tenth link being an extension of the fourth link where the fourth link connects to the third link.

16 Claims, 6 Drawing Sheets

(56) References Cited

U.S. PATENT DOCUMENTS

| | | | | |
|---|---|---|---|---|
| 4,089,147 A * | 5/1978 | Bain | ............... | E04B 1/344 |
| | | | | 248/421 |
| 5,002,293 A * | 3/1991 | Gottselig | ............... | B62B 3/02 |
| | | | | 108/145 |
| 5,078,056 A * | 1/1992 | McCauley | ............... | A47B 3/00 |
| | | | | 108/115 |
| 5,366,203 A * | 11/1994 | Huffman | ............... | E04B 9/003 |
| | | | | 248/277.1 |
| 8,348,207 B2 * | 1/2013 | Wang | ............... | A47C 19/14 |
| | | | | 248/188.6 |
| 2003/0010967 A1 * | 1/2003 | Enochs | ............... | B66F 7/0666 |
| | | | | 254/266 |
| 2015/0023031 A1 * | 1/2015 | Endo | ............... | H01L 27/323 |
| | | | | 362/427 |
| 2018/0007803 A1 * | 1/2018 | Giuseppe | ............... | F16M 11/10 |
| 2018/0283662 A1 * | 10/2018 | Kennedy | ............... | F21V 21/24 |

* cited by examiner

HEIGHT ADJUSTABLE STAND

CROSS-REFERENCE TO RELATED APPLICATIONS

The present application is a filing under 35 U.S.C. 371 as the National Stage of International Application No. PCT/SG2017/050370, filed Jul. 21, 2017, entitled "HEIGHT ADJUSTABLE STAND," which is incorporated herein by reference in its entirety for all purposes.

BACKGROUND

It is often desirable to position articles such as lamps and ornaments (including plants) in an elevated position, whether to cast a better light or for better visibility of the article. In particular, a stand that is adjustable in height is advantageous for allowing the elevation of the article to be appropriately selected. However, currently available height adjustable stands are often precarious when raised and also lack ready portability.

SUMMARY

A height adjustable stand for elevating an article, the height adjustable stand comprising: a first four-bar linkage comprising a concave quadrilateral linkage formed by a first link, a second link, a third link and a fourth link in successive pivoting-only connection, wherein an internal angle between the second link and the third link is more than 180°, the first link defining a minimum length of a base of the stand; a second four-bar linkage comprising a convex quadrilateral linkage formed by a fifth link, a sixth link, a seventh link and an eighth link in successive pivoting-only connection, wherein the fifth link is an extension of the second link from where the second link is connected to the third link, wherein the sixth link is one and the same as the third link; and a third four-bar linkage comprising a convex quadrilateral linkage formed by a ninth link, a tenth link, an eleventh link and a twelfth link in successive pivoting-only connection, wherein the ninth link comprises the seventh link together with an extension of the seventh link from where the seventh link is connected to the eighth link, and wherein the tenth link is an extension of the fourth link from where the fourth link is connected to the third link.

A sum of length of the fifth link and length of the sixth link may be equal to a sum of length of the seventh link and length of the eighth link.

The second four-bar linkage may be a parallelogram linkage.

The height adjustable stand may further comprise an extension of the first link from where the first link is connected to the second link to increase stability of the stand when the stand is extended.

A sum of length of the extension of the first link and length of the second link may be equal to a sum of length of the third link and length of the extension of the fourth link.

The height adjustable stand may further comprise a fourth four-bar linkage formed by a thirteenth link, a fourteenth link, a fifteenth link and a sixteenth link in successive pivoting-only connection, wherein the thirteenth link is an extension of the eleventh link where the eleventh link is connected to the twelfth link, wherein the fourteenth link is an extension of the twelfth link where the twelfth link is connected to the eleventh link, and further comprising an extension of the sixteenth link where the sixteenth link is connected to the fifteenth link.

The height adjustable stand may further comprise a seventeenth link in only pivoting connection with a free end of the extension of the sixteenth link.

The article may comprise a lamp provided adjacent a free end of the seventeenth link.

The lamp may include one of: a USB connector and a magnetic connector for connecting a power cable to the lamp.

The height adjustable stand may comprise a first set of the first, second and third four-bar linkages and a second set of the first, second and third four-bar linkages; wherein the second set is inverted over the first set, and wherein the ninth link, tenth link, eleventh link and twelfth link of the first set are one and the same as the eleventh link, twelfth link, ninth link and tenth link of the second set respectively.

The height adjustable stand may comprise a first set of the first, second and third four-bar linkages and a second set of the first, second and third four-bar linkages; wherein the second set is inverted over the first set, and wherein the third four-bar linkages of each set are connected via an additional four-bar linkage. The additional four-bar linkage may be formed by a thirteenth link, a fourteenth link, a fifteenth link and a sixteenth link in successive pivoting-only connection, wherein the thirteenth link is an extension of the eleventh link of the first set where the eleventh link of the first set is connected to the twelfth link of the first set, wherein the fourteenth link is an extension of the twelfth link of the first set where the twelfth link of the first set is connected to the eleventh link of the first set, wherein the fifteenth link is an extension of the eleventh link of the second set where the eleventh link of the second set is connected to the twelfth link of the second set, and wherein the sixteenth link is an extension of the twelfth link of the second set where the twelfth link of the second set is connected to the eleventh link of the second set.

A first link of the second set may be a top link of the stand and the top link may be always parallel with the base.

Each link may comprise a panel of any appropriate length and shape.

All the links may lie parallel to each other when the stand is fully collapsed.

Length of the base remains the same when the stand is extended and when the stand is collapsed.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Figure 1:
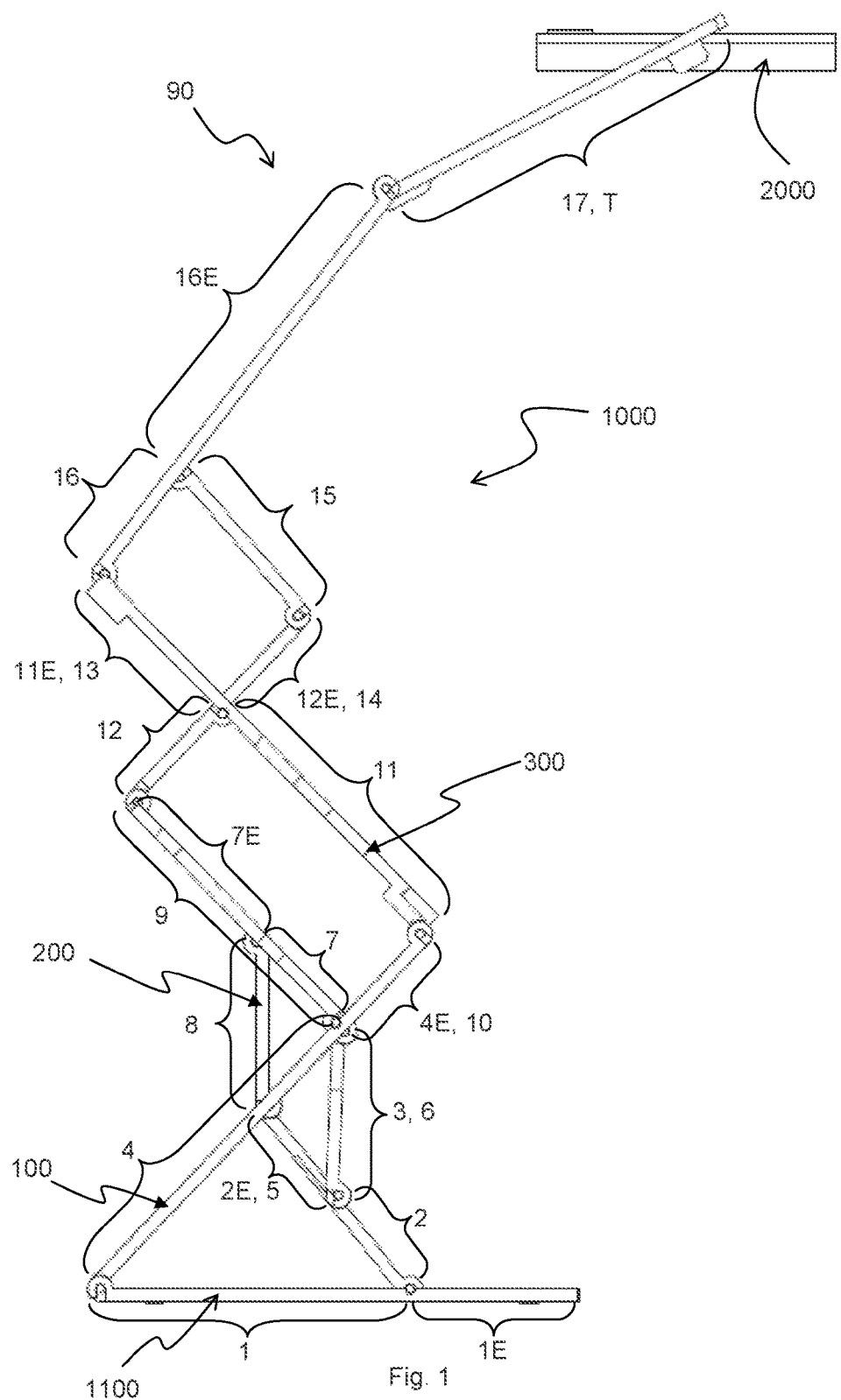
FIG. 1 is a side view of a first exemplary embodiment of a height adjustable stand supporting a lamp in an extended position.

Exemplary embodiments of the height adjustable stand 1000 will be described below with reference to FIGS. 1 to 6. The same reference numerals are used in the different figures to denote the same or similar parts.

As can be seen in FIG. 1 and FIGS. 3 to 6, all embodiments of the height adjustable stand 1000 comprise a first four-bar linkage 100, a second four-bar link age 200 and a third four-bar linkage 300.

The first four-bar linkage is formed by a first link 1, a second link 2, a third link 3 and a fourth link 4 in successive only pivoting connection. By "successive pivoting-only connection" it is meant that the first four-bar linkage 100 is a planar quadrilateral linkage in which a second end of the first link 1 is connected to a first end of the second link 2 via a hinged joint, a second end of the second link 2 is connected to a first end of the third link 3 via a hinged joint, a second end of the third link 3 is connected to a first end of the fourth link 4 via a hinged joint, and a second end of the fourth link 4 is connected to a first end of the first link 1 via a hinged joint. The first four-bar linkage 100 is a concave quadrilateral linkage wherein the internal angle between the second link 2 and the third link 3 is more than 180°.

The second four-bar linkage 200 is formed by a formed by a fifth link 5, a sixth link 6, a seventh link 7 and an eighth link 8 in successive only pivoting connection. By "successive pivoting-only connection" it is meant that the second four-bar linkage 200 is a planar quadrilateral linkage in which a second end of the fifth link 5 is connected to a first end of the sixth link 6 via a hinged joint, a second end of the sixth link 6 is connected to a first end of the seventh link 7 via a hinged joint, a second end of the seventh link 7 is connected to a first end of the eigth link 8 via a hinged joint, and a second end of the eight link 8 is connected to a first end of the fifth link 5 via a hinged joint. The fifth link 5 is an extension 2E of the second link 2 from where the second link 2 is connected to the third link 3, and the sixth link 6 is one and the same as the third link 3. The second four-bar linkage 200 is a convex quadrilateral linkage. Preferably, a sum of the length of the fifth link 5 and the length of the sixth link 6 is equal to a sum of the length of the seventh link 7 and the length of the eighth link 8. Further preferably, the second four-bar linkage 200 is a parallelogram linkage.

The third four-bar linkage 300 is formed by a ninth link 9, a tenth link 10, an eleventh link 11 and a twelfth link 12 in successive pivoting connection. By "successive pivoting-only connection" it is meant that the third four-bar linkage 300 is a planar quadrilateral linkage in which a second end of the ninth link 9 is connected to a first end of the tenth link 10 via a hinged joint, a second end of the tenth link 10 is connected to a first end of the eleventh link 11 via a hinged joint, a second end of the eleventh link 11 is connected to a first end of the twelfth link 12 via a hinged joint, and a second end of the twelfth link 12 is connected to a first end of the ninth link 9 via a hinged joint. The ninth link 9 comprises the seventh link 7 together with an extension 7E of the seventh link 7 from where the seventh link 7 is connected to the eighth link 8, and the tenth link 10 is an extension 4E of the fourth link 4 from where the fourth link 4 is connected to the third link 3. The third four-bar linkage 300 is a convex quadrilateral linkage.

Notably, the stand 1000 does not comprise any prismatic or sliding joints. The first link 1 defines a minimum length of a base 1100 of the stand 1000. For greater stability, the base 1100 of the stand may include the first link 1 together with an extension 1E of the first link 1 where the first link 1 is connected to the second link 2, so that a longer base 1100 is provided than just the length of the first link 1 alone.

When the stand 1000 is extended to elevate an article provide at a top link T of the stand 1000, no contraction of the base length of the stand 1000 is experienced by the stand 1000. The first 100, second 200, and third 300 four-bar linkages that share some common links and/or link extensions as described above articulate together to allow extension of the stand 1000 without contraction of the length of the base 1100. The combined three four-bar linkages 100, 200, 300 of the present stand 1000 is therefore unlike scissor mechanisms where an increase in height is necessarily accompanied by a decrease in base length that results in reduced stability as extension is increased. By retaining the same base length while allowing extension of the stand 1000, greater stability is achieved for the stand 1000.

Extension of the stand 1000 may be effected by pulling on the first link 1 and the top link T of the stand 1000 to increase displacement between the first link and the top link T. Alternatively, a motorized actuator or other drive mechanism (not shown) may be provided to displace the links accordingly to extend the stand 1000 and also to collapse the stand 1000.

To keep the stand 1000 at an extended position, the hinged joints in the stand 1000 may comprise friction hinges that have sufficient inherent friction to remain stationary under the combined weight of the stand 1000 and any article provided on the stand 1000 when the stand 1000 has been extended.

Figure 4:
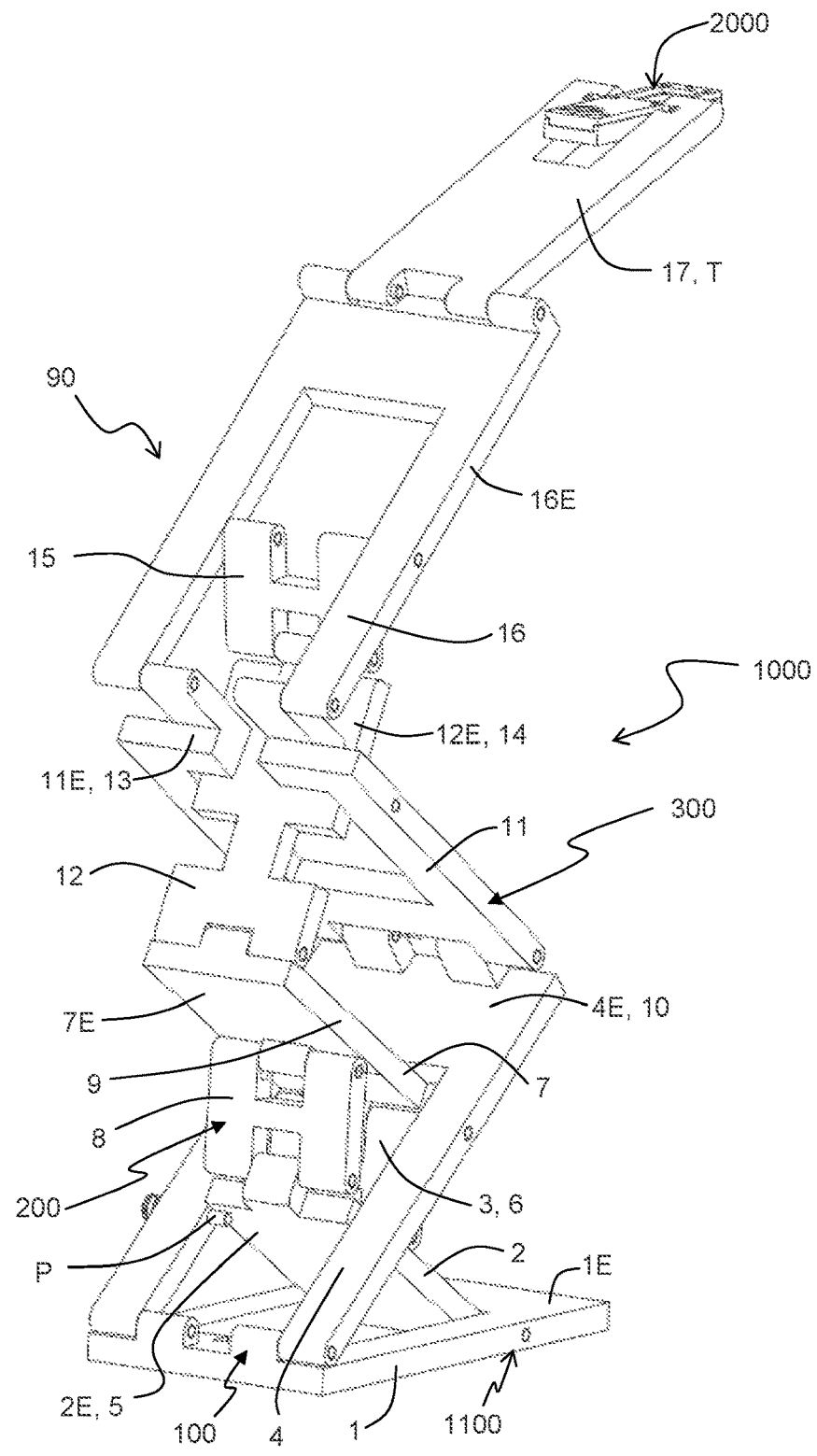
FIG. 4 is a rear perspective view of an alternative configuration of the first exemplary embodiment of the stand.

Alternatively, a lock pin P may be orthogonally provided on the fourth link 4 as shown in FIG. 4 such that when the stand 1000 is extended until the extension 2E of the second link 2 (or fifth link 5) is above the lock pin P and the lock pin P is extended out of the fourth link 4, the extension 2E of the second link 2 (or fifth link 5) can come to rest against the extended lock pin P, so that the extended lock pin P supports the weight of all components of the stand 1000 above the fifth link 5, and prevents collapse of the stand 1000. Appreciably, the same or an additional motorized actuator or other drive mechanism (not shown) that may be provided to extend and/or collapse the stand 1000 may also be used or provided to active and deactivate the lock pin P or any other locking mechanism that may be provided on the stand 1000 to keep the stand 1000 in a desired position.

Figure 5:
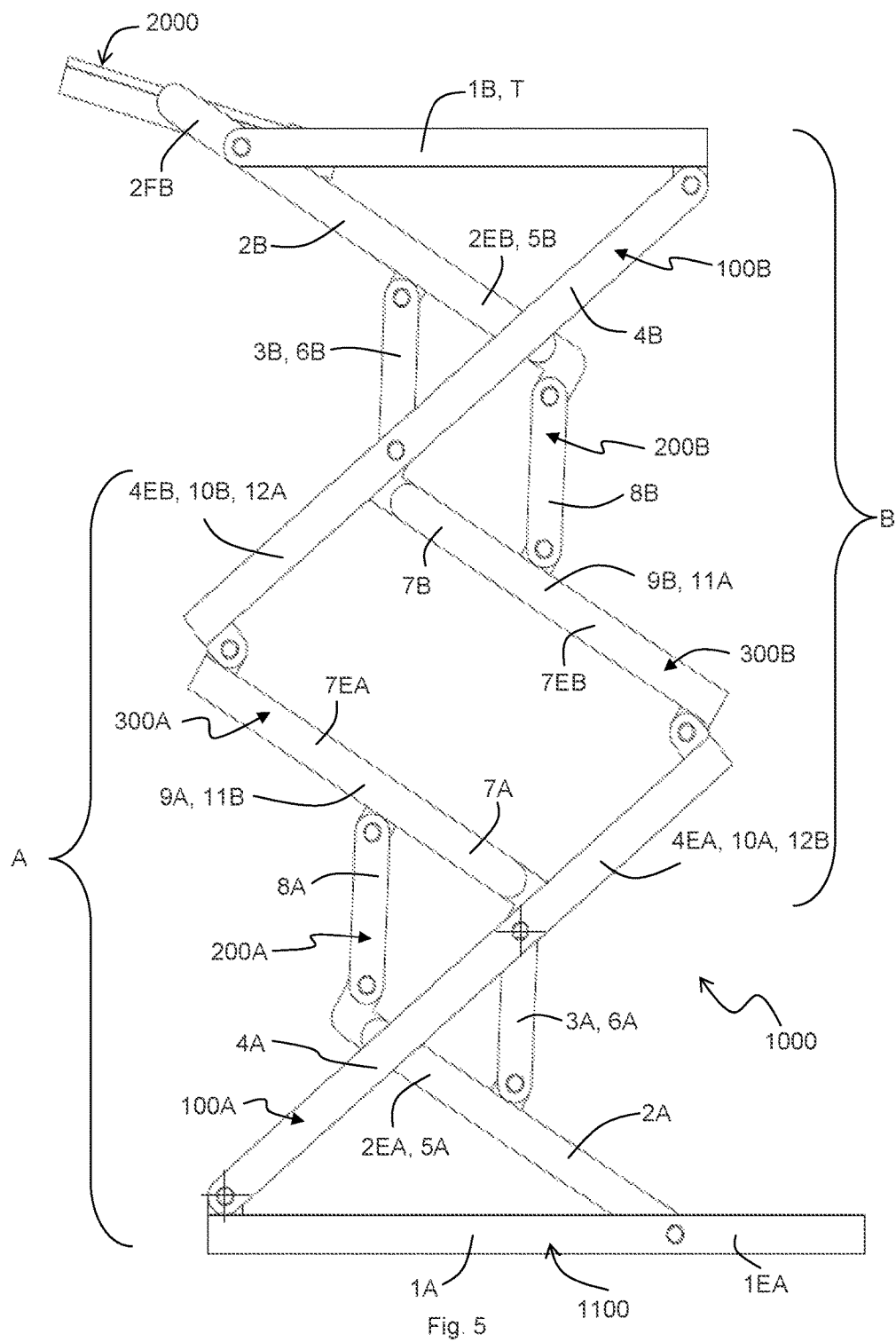
FIG. 5 is a side view of a second exemplary embodiment of the stand.
Figure 6:
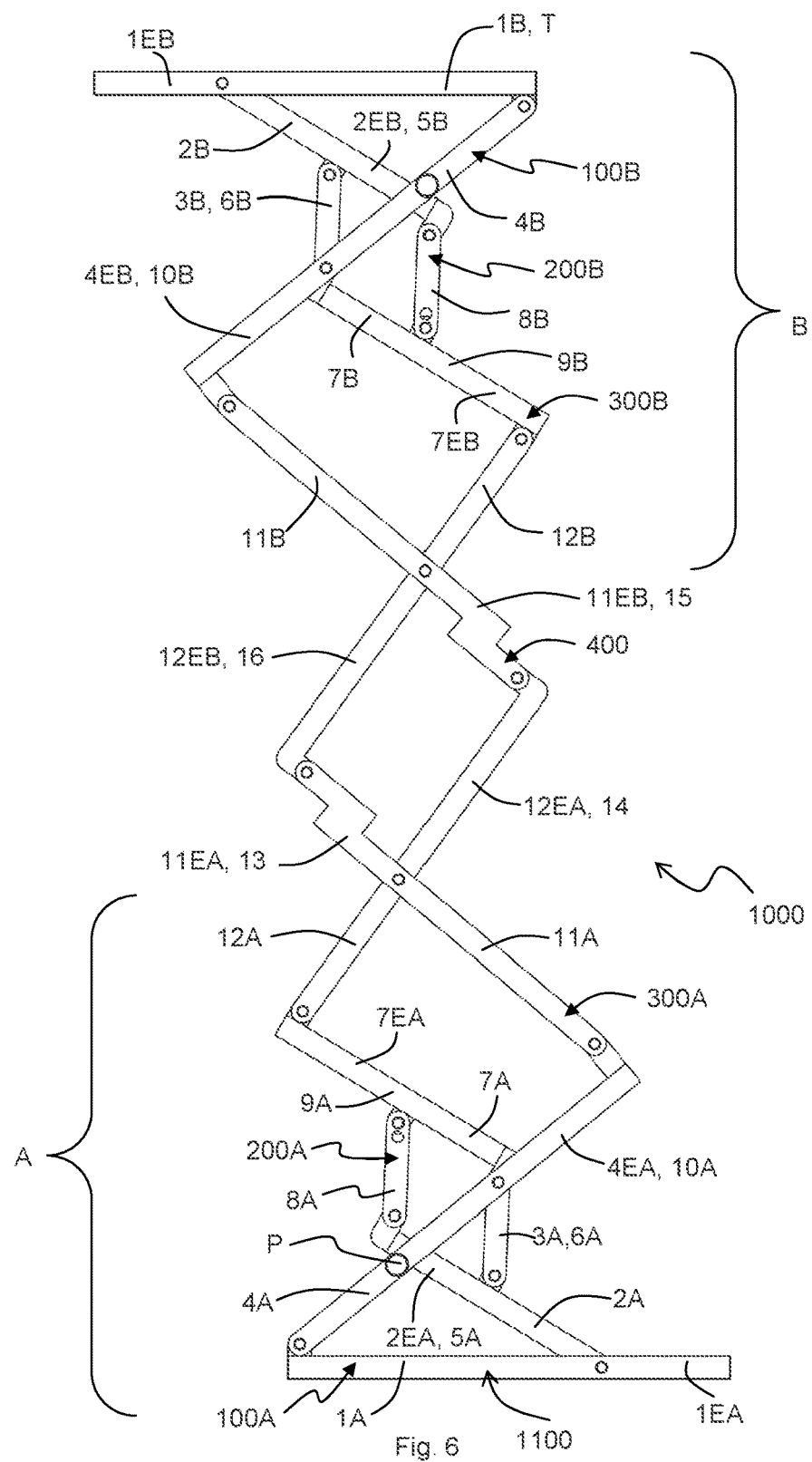
FIG. 6 is a side view of a third exemplary embodiment of the stand.

When the stand 1000 is extended, the first, second and third four-bar linkages 100, 200, 300 define three quadrilateral shapes respectively, as can be seen in FIGS. 1, 5 and 6. To collapse the stand 1000, the first link 1 and top link T are pushed together (first retracting the lock pin P into the fourth link 4 if a lock pin P is provided) to reduce displacement between the first link 1 and top link T. Alternatively, the motorized actuator or drive mechanism (if provided) may be activated accordingly.

Figure 2:
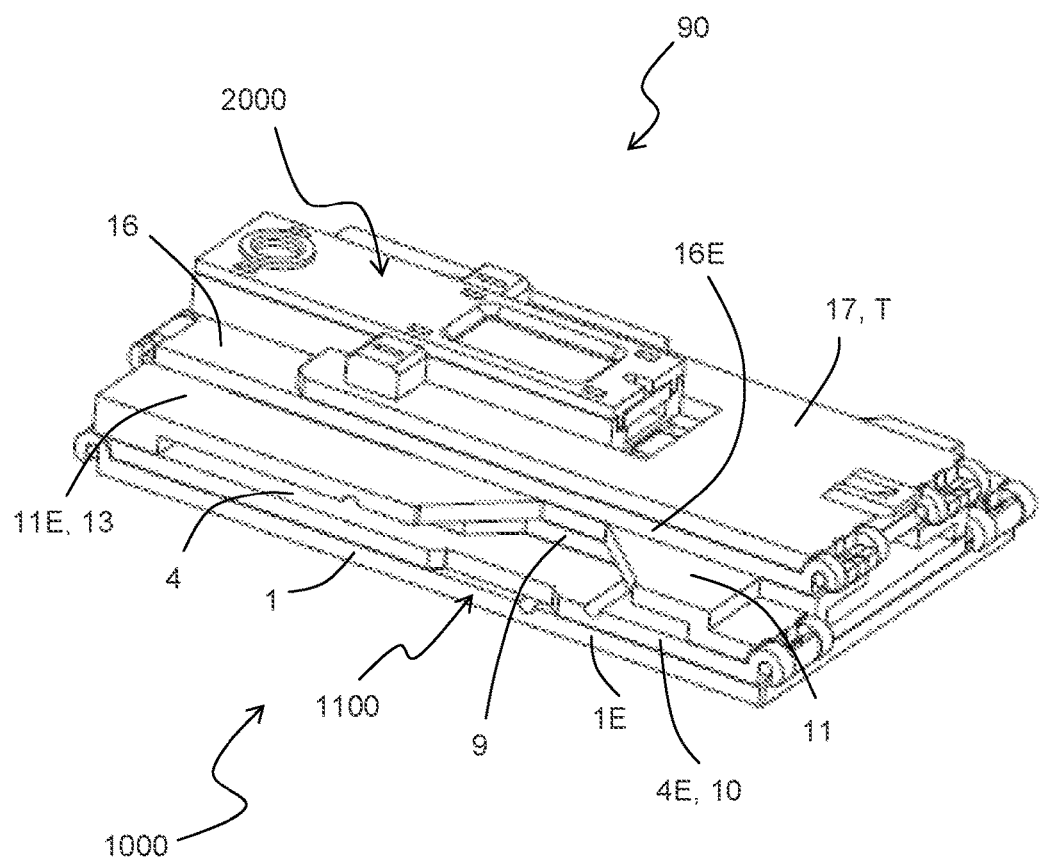
FIG. 2 is a front perspective view of the stand of FIG. 1 in a fully collapsed position.

When the stand 1000 is fully collapsed, as shown in FIG. 2, all the links of the stand 1000 lie parallel to each other. In this way, the collapsed stand 1000 takes up a minimum amount of space. Preferably, a sum of the length of the extension 1E of the first link 1 and the length of the second link 2 is equal to a sum of the length of the third link 3 and the length of the extension 4E of the fourth link 4 so that when the stand 1000 is fully collapsed, the ends of the links lie directly atop each other for a flush finish at the side edges of the stand 1000.

In different embodiments of the stand 1000, examples being described below, additional links may be added to the first, second and third four-bar linkages 100, 200, 300 already described above.

Figure 3:
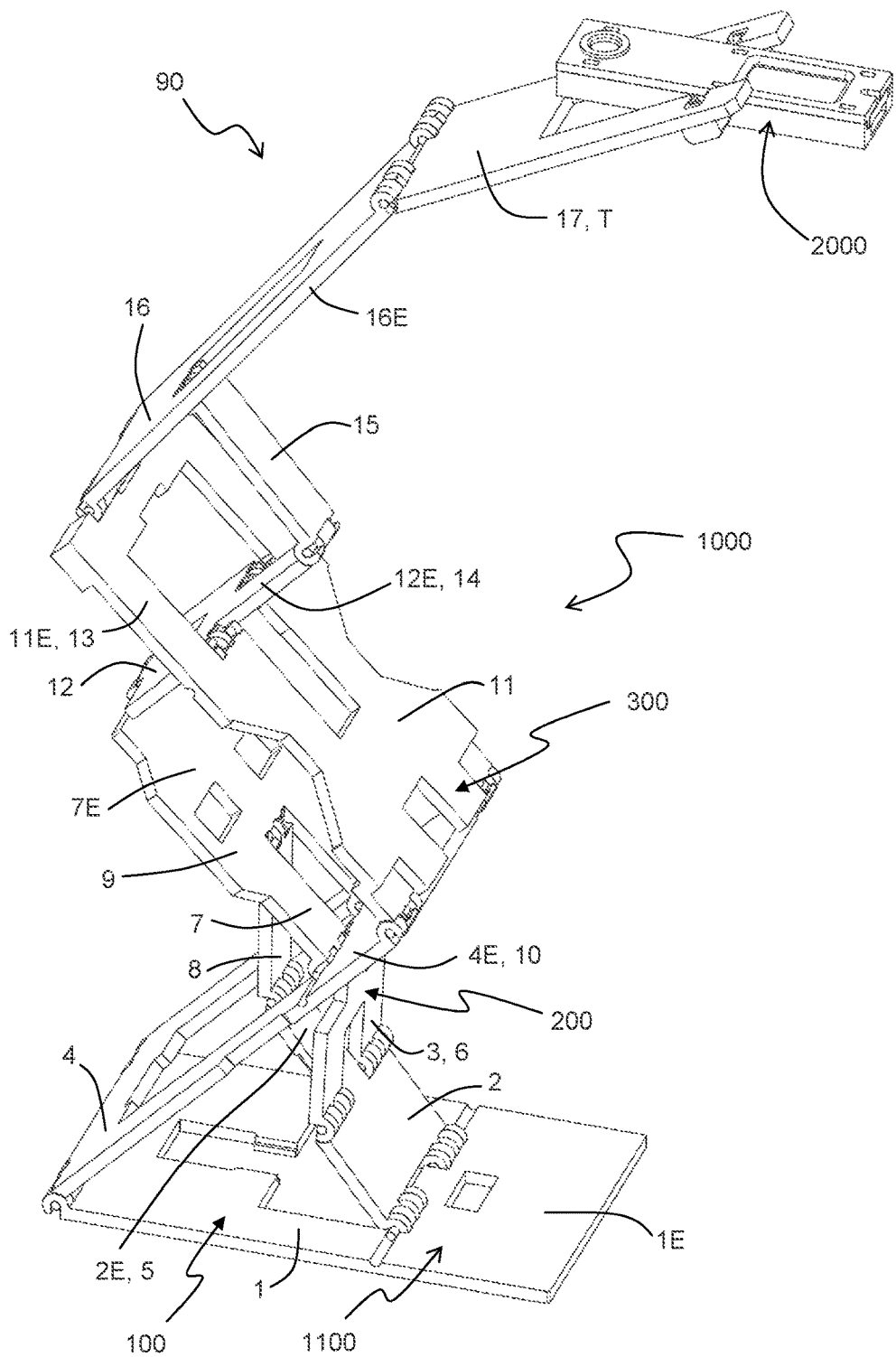
FIG. 3 is a front perspective view of the stand of FIG. 1 in the extended position.

In a first exemplary embodiment of the stand 1000 as shown in FIGS. 1 to 3, the stand 1000 preferably further comprises a fourth four-bar linkage 400 formed by a thirteenth link 13, a fourteenth link 14, a fifteenth link 15 and a sixteenth link 16 in successive pivoting-only connection. By "successive pivoting-only connection" it is meant that the fourth four-bar linkage 400 is a planar quadrilateral linkage in which a second end of the thirteenth link 13 is connected to a first end of the fourteenth link 14 via a hinged joint, a second end of the fourteenth link 14 is connected to a first end of the fifteenth link 15 via a hinged joint, a second end of the fifteenth link 15 is connected to a first end of the sixteenth link 16 via a hinged joint, and a second end of the sixteenth link 16 is connected to a first end of the thirteenth link 13 via a hinged joint. The thirteenth link 13 is an extension 11E of the eleventh link 11 where the eleventh link 11 is connected to the twelfth link 12. The fourteenth link 14 is an extension 12E of the twelfth link 12 where the twelfth link 12 is connected to the eleventh link 11. The standing light 90 preferably further includes an extension 16E of the sixteenth link 16 where the sixteenth link 16 is connected to the fifteenth link 15. A seventeenth link 17 is preferably also provided to be in pivoting-only connection with a free end of the extension 16E of the sixteenth link 16.

The first exemplary embodiment of the stand 1000 may be configured to support a lamp 2000 so that the stand 1000 and the lamp 2000 together form a portable standing light 90 that can be fully collapsed for convenient storage to be carried about when not in use. The lamp 2000 is preferably provided adjacent a free end of the seventeenth link 17 which is the top link T of the stand 1000, and preferably includes a USB connector or a magnetic connector for connecting a power cable to the lamp 2000. The power cable may then be connected to a power source such as a mobile phone, battery or power bank, personal computer, or USB power adaptor. The lamp 2000 is preferably operated via a printed circuit board having an LED array, and is further preferably incorporated with on/off and dimmer functions.

As can be seen in FIG. 3, each link of the stand 1000 may comprise a plate or panel or number of bars of any appropriate length and shape as may be desired in order to articulate with adjacent links and to lie parallel to adjacent links when the stand 1000 is fully collapsed. Further preferably, adjacent links are configured to be able to nest one within another wherever possible so as to minimize thickness of the stand 1000 when fully collapsed. For example, FIG. 4 shows an alternative configuration to the first exemplary embodiment of the stand 1000, in which, besides other optional differences, the eight link 8 and the fifteenth link 15 are configured as H-shaped panels as opposed to the simple flat bars of the eighth link 8 and fifteenth link 15 shown in FIG. 3.

In addition, while in FIG. 3 link 13 is shown as comprising a panel having a cut-out between two parallel bars and link 14 is provided as a flat bar passing through the cut-out in link 13, in other embodiments (not shown), link 13 may alternatively be provide as a flat bar passing through a cut-out provided in an alternative link 14 that comprises two parallel bars on each side of link 13. Thus, it should be appreciated that "outside" links such as link 13 in FIG. 3 and "inside" links such as link 14 in FIG. 3 may alternatively be provided as "inside" links and "outside" links respectively.

Furthermore, for each four-bar linkage 100, 200, 300, the mechanism may be inverted in the sense that links which are currently depicted as relatively shorter in the figures may alternatively be provided as longer links while links which are currently depicted as relatively longer in the figures may alternatively be provided as shorter links. Therefore, it will be appreciated that the links of the stand 1000 are not restricted to the shapes, lengths and configuration as shown in the figures.

A second exemplary embodiment of the stand 1000 as shown in FIG. 5 comprises a first set A of the first, second and third four-bar linkages 100A, 200A, 300A and a second set B of the first, second and third four-bar linkages 100B, 200B, 300B. The second set B is inverted over the first set A, and the third four-bar linkage 300A, 300B of each set A, B is shared between both sets A and B such that the ninth link 9A, tenth link 10A, eleventh link 11A and twelfth link 12A of the first set A are one and the same as the eleventh link 11B, twelfth link 12B, ninth link 9B and tenth link 10B of the second set B respectively. In this way, the first link 1B of the second set B is the top link T while the base 1100 comprises the first link 1A of the first set A. In this embodiment, the top link T and the base 1100 are always parallel to each other. A lamp 2000 may be provide on a further extension 2FB of the second link 2B of the second set B from where the second link 2B of the second set B is connected to the first link 1B of the second set B.

A third exemplary embodiment of the stand 1000 as shown in FIG. 6 comprises a first set A of the first, second and third four-bar linkages 100A, 200A, 300A and a second set B of the first, second and third four-bar linkages 100B, 200B, 300B. The second set B is inverted over the first set A, and the third four-bar linkages 300A, 300B of each set A, B are connected via an additional four-bar linkage 400. The additional four-bar linkage 400 is formed by a thirteenth link 13, a fourteenth link 14, a fifteenth link 15 and a sixteenth link 16 in successive pivoting-only connection. By "successive pivoting-only connection" it is meant that the fourth four-bar linkage 400 is a planar quadrilateral linkage in which a second end of the thirteenth link 13 is connected to a first end of the fourteenth link 14 via a hinged joint, a second end of the fourteenth link 14 is connected to a first end of the fifteenth link 15 via a hinged joint, a second end of the fifteenth link 15 is connected to a first end of the sixteenth link 16 via a hinged joint, and a second end of the sixteenth link 16 is connected to a first end of the thirteenth link 13 via a hinged joint. The thirteenth link 13 is an extension 11EA of the eleventh link 11A of the first set A where the eleventh link 11A of the first set A is connected to the twelfth link 12A of the first set A, and the fourteenth link 14 is an extension 12EA of the twelfth link 12A of the first set A where the twelfth link 12A of the first set A is connected to the eleventh link 11A of the first set A. The fifteenth link 15 is an extension 11EB of the eleventh link 11B of the second set B where the eleventh link 11B of the second set B is connected to the twelfth link 12B of the second set B, and the sixteenth link 16 is an extension 12EB of the twelfth link 12B of the second set B where the twelfth link 12B of the second set B is connected to the eleventh link 11B of the second set B. In the third exemplary embodiment of the stand 1000, the base 1100 and top link T are also always parallel to each other. In this embodiment, the first link 1B of the second set B is the top link T and the base 1100 comprises the first link 1A of the first set A.

The links of the stand 1000 may be made of any suitable rigid material such as a plastic, metal, wood, or composite material, depending on the application of the stand 1000 and the corresponding strength and weight requirements. Various embodiments of the stand 1000 may be scaled up for industrial use and incorporated with a motorized actuator or drive mechanism to extend and collapse the stand 1000. In particular, the second and third exemplary embodiments described above with reference to FIGS. 5 and 6 where the top link T always remains parallel to the base 1100 may be configured for use as lifting platforms to elevate workers and materials to desired heights. The presently disclosed height adjustable stand 1000 is advantageous in maintaining stability during extension and elevation as no sliding joints are required and the base length remains the same whether the stand 1000 is collapsed or fully extended.

Whilst there has been described in the foregoing description exemplary embodiments of the present invention, it will be understood by those skilled in the technology concerned that many variations and combination in details of design, construction and/or operation may be made without departing from the present invention. For example, in addition to the various embodiments of the stand as already described above, further alternative embodiments of the stand may comprise additional sets of the first, second and third four-bar linkages connected by additional links where appropriate, so that the stand may comprise multiple sets of the basic mechanism comprising the first, second and third four-bar linkages. While the stand has been described above as being adjustable in a vertical direction to elevate an article provided on the stand, it should be understood that the stand may also be used or configured for use in any other particular direction such as in the horizontal or other angled direction, where extension of the stand in the particular direction may be desired.

The invention claimed is:

1. A height adjustable stand for elevating an article, the height adjustable stand comprising:
   a first four-bar linkage comprising a concave quadrilateral linkage formed by a first link, a second link, a third link and a fourth link in successive pivoting-only connection, wherein an internal angle between the second link and the third link is more than 180°, the first link defining a minimum length of a base of the stand;
   a second four-bar linkage comprising a convex quadrilateral linkage formed by a fifth link, a sixth link, a seventh link and an eighth link in successive pivoting-only connection, wherein the fifth link is an extension of the second link from where the second link is connected to the third link, wherein the sixth link is one and the same as the third link; and
   a third four-bar linkage comprising a convex quadrilateral linkage formed by a ninth link, a tenth link, an eleventh link and a twelfth link in successive pivoting-only connection, wherein the ninth link comprises the seventh link together with an extension of the seventh link from where the seventh link is connected to the eighth link, and wherein the tenth link is an extension of the fourth link from where the fourth link is connected to the third link.

2. The height adjustable stand of claim 1, wherein a sum of length of the fifth link and length of the sixth link is equal to a sum of length of the seventh link and length of the eighth link.

3. The height adjustable stand of claim 2, wherein the second four-bar linkage is a parallelogram linkage.

4. The height adjustable stand of claim 1, further comprising an extension of the first link from where the first link is connected to the second link to increase stability of the stand when the stand is extended.

5. The height adjustable stand of claim 1, wherein a sum of length of the extension of the first link and length of the second link is equal to a sum of length of the third link and length of the extension of the fourth link.

6. The height adjustable stand of claim 1, further comprising a fourth four-bar linkage formed by a thirteenth link, a fourteenth link, a fifteenth link and a sixteenth link in successive pivoting-only connection, wherein the thirteenth link is an extension of the eleventh link where the eleventh link is connected to the twelfth link, wherein the fourteenth link is an extension of the twelfth link where the twelfth link is connected to the eleventh link, and further comprising an extension of the sixteenth link where the sixteenth link is connected to the fifteenth link.

7. The height adjustable stand of claim 6, further comprising a seventeenth link in only pivoting connection with a free end of the extension of the sixteenth link.

8. The height adjustable stand of claim 7, wherein the article comprises a lamp provided adjacent a free end of the seventeenth link.

9. The height adjustable stand of claim 8, wherein the lamp includes one of: a USB connector and a magnetic connector for connecting a power cable to the lamp.

10. The height adjustable stand of claim 1, wherein the stand comprises a first set of the first, second and third four-bar linkages and a second set of the first, second and third four-bar linkages; wherein the second set is inverted over the first set, and wherein the ninth link, tenth link, eleventh link and twelfth link of the first set are one and the same as the eleventh link, twelfth link, ninth link and tenth link of the second set respectively.

11. The height adjustable stand of claim 10, wherein a first link of the second set is a top link of the stand and the top link is always parallel with the base.

12. The height adjustable stand of claim 1, wherein the stand comprises a first set of the first, second and third four-bar linkages and a second set of the first, second and third four-bar linkages; wherein the second set is inverted over the first set, and wherein the third four-bar linkages of each set are connected via an additional four-bar linkage.

13. The height adjustable stand of claim 12, wherein the additional four-bar linkage is formed by a thirteenth link, a fourteenth link, a fifteenth link and a sixteenth link in successive pivoting-only connection, wherein the thirteenth link is an extension of the eleventh link of the first set where the eleventh link of the first set is connected to the twelfth link of the first set, wherein the fourteenth link is an extension of the twelfth link of the first set where the twelfth link of the first set is connected to the eleventh link of the first set, wherein the fifteenth link is an extension of the eleventh link of the second set where the eleventh link of the second set is connected to the twelfth link of the second set, and wherein the sixteenth link is an extension of the twelfth link of the second set where the twelfth link of the second set is connected to the eleventh link of the second set.

14. The height adjustable stand of claim 1, wherein each link comprises a panel.

15. The height adjustable stand of claim 1, wherein all the links lie parallel to each other when the stand is fully collapsed.

16. The height adjustable stand of claim 1, wherein length of the base remains the same when the stand is extended and when the stand is collapsed.

* * * * *